United States Patent
Kulkarni et al.

(10) Patent No.: US 11,770,310 B2
(45) Date of Patent: Sep. 26, 2023

(54) METHOD AND SYSTEM FOR PERFORMING DATA PROTECTION SERVICES USING A SUBSYSTEM LEVEL FEEDBACK MECHANISM

(71) Applicant: EMC IP Holding Company LLC, Hopkinton, MA (US)

(72) Inventors: Gururaj Kulkarni, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/384,190

(22) Filed: Jul. 23, 2021

(65) Prior Publication Data

US 2022/0400064 A1    Dec. 15, 2022

(30) Foreign Application Priority Data

Jun. 10, 2021 (IN) .............................. 202141025762

(51) Int. Cl.
*H04L 41/5009* (2022.01)
*H04L 43/0817* (2022.01)
*H04L 41/0816* (2022.01)
*H04L 41/142* (2022.01)

(52) U.S. Cl.
CPC ...... *H04L 41/5009* (2013.01); *H04L 41/0816* (2013.01); *H04L 41/142* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 9,628,561 | B1* | 4/2017 | Kulkarni | G06F 11/1464 |
| 2009/0049443 | A1* | 2/2009 | Powers | G06F 9/505 |
| | | | | 718/100 |
| 2011/0047329 | A1* | 2/2011 | O'Rourke | G06F 11/3485 |
| | | | | 711/E12.016 |
| 2014/0007121 | A1* | 1/2014 | Caufield | G06F 9/4843 |
| | | | | 718/103 |

* cited by examiner

*Primary Examiner* — John A Follansbee
*Assistant Examiner* — Fadi Haj Said
(74) *Attorney, Agent, or Firm* — Chamberlain, Hrdlicka, White, Williams & Aughtry (57) ABSTRACT

Techniques described herein relate to a method for managing performances of data protection services. The method may include obtaining subsystem statistics from subsystems; in response to obtaining the subsystem statistics, making a determination that the subsystem statistics indicate a concurrency adjustment; and in response to the determination, assigning an adjusted concurrency to the subsystems based on the subsystem statistics and priorities; and initiating performance of data protection services using the adjusted concurrency.

17 Claims, 8 Drawing Sheets

METHOD AND SYSTEM FOR PERFORMING DATA PROTECTION SERVICES USING A SUBSYSTEM LEVEL FEEDBACK MECHANISM

BACKGROUND

Computing devices may provide services. To provide the services, the computing devices may include hardware components and software components. Data may be generated by the computing devices during the performance of the services. The data may be important to users. To protect the data, backups of the data may be generated and stored in storage devices.

SUMMARY

In general, in one aspect, the invention relates to a method for managing performances of data protection services in accordance with one or more embodiments of the invention. The method includes obtaining subsystem statistics from subsystems; in response to obtaining the subsystem statistics: making a determination that the subsystem statistics indicate a concurrency adjustment; and in response to the determination: assigning adjusted concurrencies to the subsystems based on the subsystem statistics and priorities; and initiating performance of data protection services using the adjusted concurrencies.

In general, in one aspect, the invention relates to a system for managing performances of data protection services in accordance with one or more embodiments of the invention. The system includes persistent storage for storing subsystem statistics and a data protection manager. The data protection manager includes a processor and memory and is configured to obtain subsystem statistics from subsystems; in response to obtaining the subsystem statistics: make a determination that the subsystem statistics indicate a concurrency adjustment; and in response to the determination: assign adjusted concurrencies to the subsystems based on the subsystem statistics and priorities; and initiate performance of data protection services using the adjusted concurrencies.

In general, in one aspect, the invention relates to a non-transitory computer readable medium which includes computer readable program code, which when executed by a computer processor enables the computer processor to perform a method for managing performances of data protection services in accordance with one or more embodiments of the invention. The method includes obtaining subsystem statistics from subsystems; in response to obtaining the subsystem statistics: making a determination that the subsystem statistics indicate a concurrency adjustment; and in response to the determination: assigning adjusted concurrencies to the subsystems based on the subsystem statistics and priorities; and initiating performance of data protection services using the adjusted concurrencies.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general embodiments of the invention relate to a system and method for managing data protection services for various subsystems of a data protection system. More specifically, embodiments of the invention relate to assigning and adjusting subsystem concurrencies based on the subsystem statistics collected from the subsystems during the performance of the data protection services.

Figure 1A:
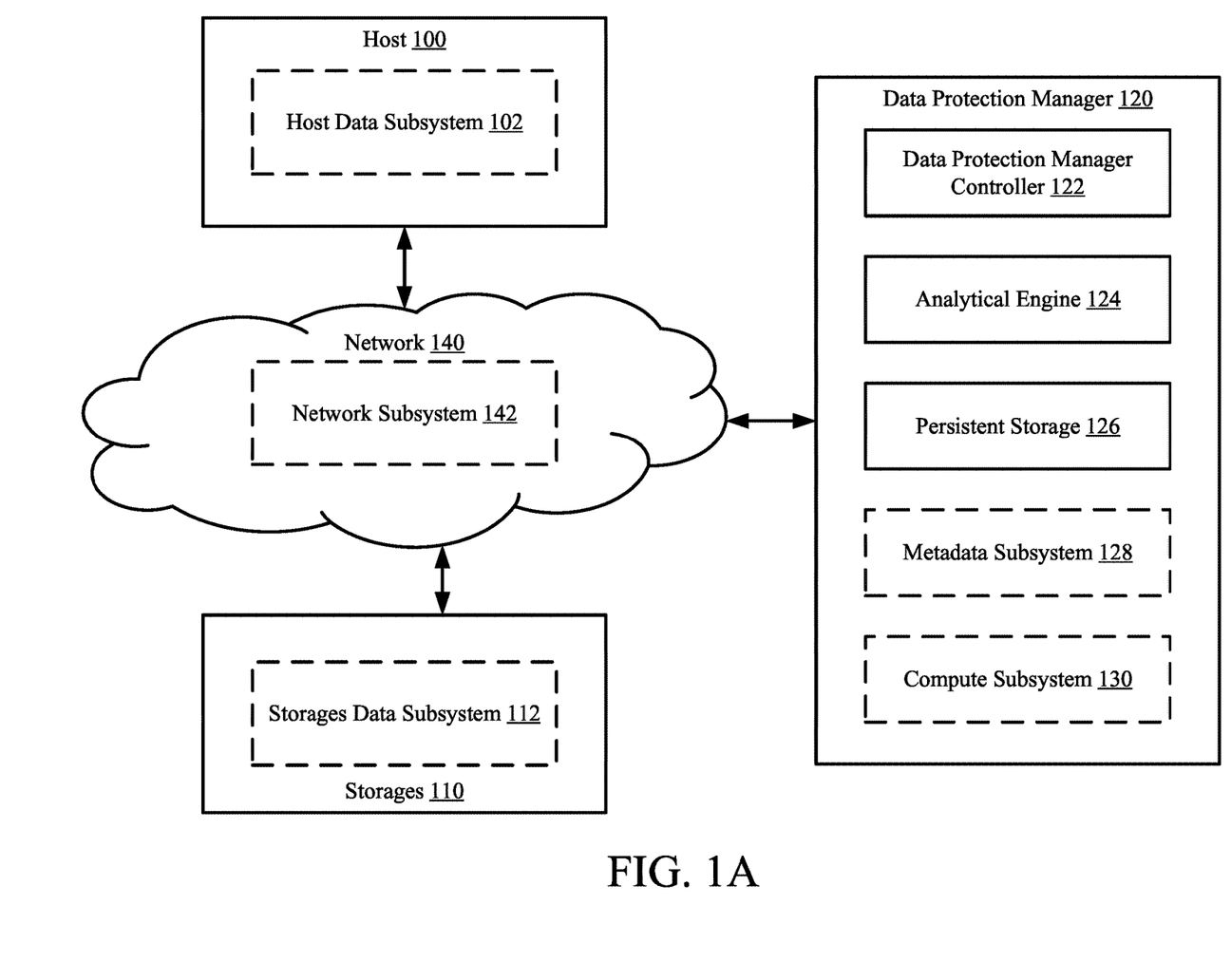
FIG. 1A shows a diagram of a system in accordance with one or more embodiments of the invention.

FIG. 1A shows a diagram of a system in accordance with one or more embodiments of the invention. The system may include a host (100), storages (110), a network (140), and a data protection manager (120). The system may include other and/or additional components without departing from the invention.

The host (100) provides computer implemented services to entities not illustrated in FIG. 1A such as, for example, clients. The computer implemented services may include database services, instant messaging services, electronic communication services, and any other type of computer implemented services without departing from the invention. The host (100) may obtain data protection services from the data protection manager (120), backup storage services from the storages (110) and data transmission services from the network (140). The host (100) may obtain and/or provide other and/or additional services without departing from the invention. For additional information regarding the host (100), refer to FIG. 1B.

In one or more embodiments of the invention, the host (100) hosts one or more applications (not shown). In one or more embodiments of the invention, the application(s) perform computer implemented services for e.g., clients. Performing the computer implemented services may include performing operations on data that is stored in the host (100). The operations may include creating data, moving data, modifying data, deleting data, and other and/or additional operations on host data and/or metadata without departing from the invention. The application(s) and/or users of the client(s) may include functionality for performing the aforementioned operations on the host data in the host (100). The application(s) may be, for example, instances of databases, email servers, and/or other applications. The host (100) may host other types of applications without departing from the invention.

In one or more of embodiments of the invention, the application(s) is implemented as computer instructions, e.g., computer code, stored on a persistent storage (not shown) that when executed by a processor(s) of the host (100) cause the host (100) to provide the functionality of the application(s) described throughout this application.

Figure 4:
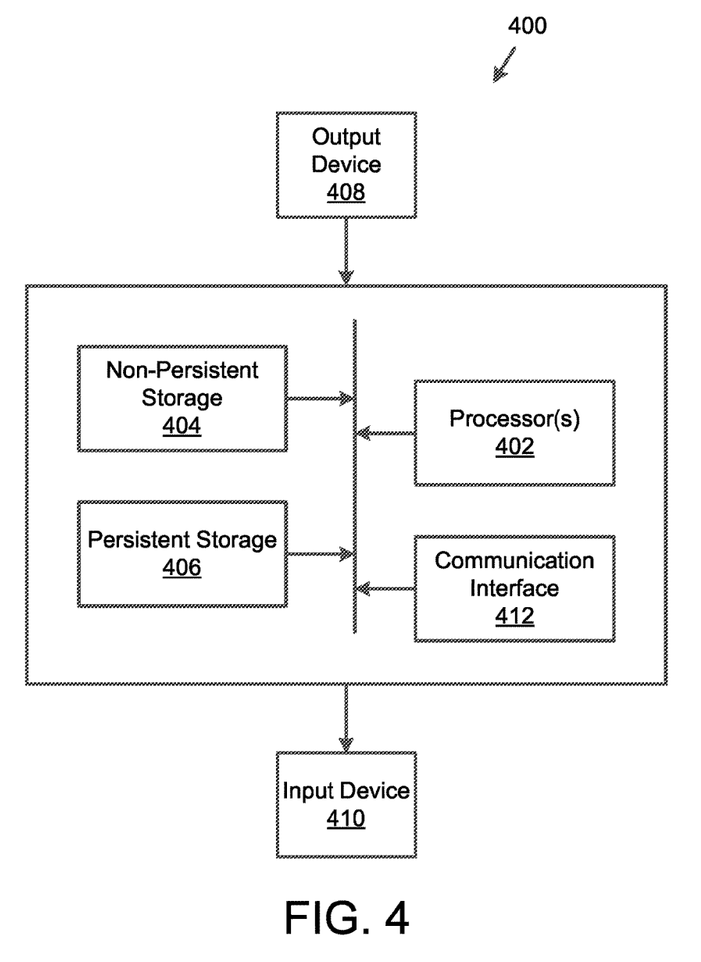
FIG. 4 shows a diagram of a computing device in accordance with one or more embodiments of the invention.

In one or more embodiments of the invention, the host (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the host (100) includes the host data subsystem (102). The host data subsystem (102) may include any number of data movers, agent services, and/or replication engines and/or any other components of the host (100) that that perform backup and/or replication operations of the data protection services without departing from the invention. The host data subsystem (102) may read data from an asset source hosted by the host (100) (e.g., a virtual machine, a SQL database, a file system, and/or other and/or additional types of applications) and transmit the data to other components of the system such as the storages (110) and the data protection manager (120). The host data subsystem (102) may include other and/or additional components and/or functionalities without departing from the invention.

In one or more embodiments of the invention, the network (140) performs data transmission services for the host (100), the data protection manager (120) and the storages (110). The network may include a network subsystem (142). The network subsystem may include any number of network devices (e.g., routers, switches, gateways, etc.) that transmit data from one device to another and/or one subsystem to another subsystem. The network subsystem (142) may be shared across multiple targets (e.g., host (100), storages (110), and the data protection manager (120)) without departing from the invention. The network subsystem (142) may include other and/or additional components and may include other and/or additional functionalities without departing from the invention.

In one or more embodiments of the invention, the storage (110) includes the functionality to provide backup storage services to the host (100) as discussed above. The backup storage services may include (i) obtaining backups of data generated through the performance of computer implemented services, (ii) storing data and metadata associated with the backups in persistent storage (not shown) of the storages (110), and (iii) providing backup data and/or metadata to the host (100) and/or data protection manager (120) for restoration purposes and/or other and/or additional purposes without departing from the invention. The backup storage services may include other and/or additional services without departing from the invention. The storages (110) may include any number of storages without departing from the invention.

In one or more embodiments of the invention, the storages (110) are implemented as computing devices (see e.g., FIG. 4). A computing device of the computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a backup storage (e.g., backup storage A (120A)) of the storages (110) described throughout this application.

In one or more embodiments of the invention, the storages (110) are implemented as logical devices. The logical devices may utilize the computing resources of any number of computing devices and thereby provide the functionality of the storages (110) described throughout this application.

In one or more embodiments of the invention, the storages (110) include the storages data subsystem (112). The storages data subsystem (112) may include any number of data movers, agent services, and/or replication engines and/or any other components of the storages (110) that that perform at least a portion of the backup and/or replication operations of the data protection services without departing from the invention. The storages data subsystem (112) may obtain backups, replications, and/or copies of asset data from the host (100) and store the backups, replications, and/or copies of the asset data from the asset source in persistent storages for restoration purposes. The storages data subsystem (112) may include other and/or additional components and/or other and/or additional functionalities without departing from the invention.

In one or more embodiments of the invention, the data protection manager includes the functionality to provide data protection services for the host (100). The data protection services may include initiating the performance of data protection services based on protection policies and assigning and updating concurrent operations to subsystems (e.g., host data subsystem (102), network subsystem (142), storages data subsystem (112), metadata subsystem (128), and a compute subsystem (130)) included in the system. The system may include other and/or additional subsystems without departing from the invention. For example, the host (100) may further include a compute subsystem (130) to perform complex to perform additional data protection services such as deduplication, compression, encryption, etc.

In one or more embodiments of the invention, the data protection manager (120) is implemented as a computing device (see e.g., FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the data protection manager (120) described throughout this application.

In one or more embodiments of the invention, the data protection manager (120) is implemented as a logical devices. The logical device may utilize the computing resources of any number of computing devices and thereby provide the functionality of the data protection manager (120) described throughout this application.

To provide the aforementioned data protection services, the data protection manager (120) may include a data protection manager controller (122), an analytical engine (124), persistent storage (126), a metadata subsystem (128) and a compute subsystem (130). The data protection manager (120) may include other and/or additional components without departing from the invention.

In one or more embodiments of the invention, the data protection manager controller (122). The data protection manager controller may initiate the performance of data protection services based on protection policies and a priority specified by the protection policies and assign concurrent operations to the subsystems to perform the data protection services. The data protection manager controller (122) may include other and/or additional functionalities without departing from the invention.

In one or more embodiments of the invention, the data protection manager controller (122) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the data protection management controller (122) described throughout this application.

In one or more embodiments of the invention, the data protection manager controller (122) is implemented as computer instructions, e.g., computer code, stored on a persistent storage that when executed by a processor of the data protection manager (120) causes the data protection manager (120) to provide the functionality of the data protection manager controller (122) described throughout this application.

In one or more embodiments of the invention, an analytical engine (124) of the data protection manager (120) periodically collects the subsystem statistics from each subsystem (i.e., 102, 112, 128, 130, 142). The analytical engine (124) may also collect subsystem level resource utilization for each subsystem, which may be included in the subsystem statistics. The subsystem level resource utilization may include CPU utilization, memory utilization, input and output operations, network information and capacities, and other and/or additional information associated with the subsystem level resource utilization without departing from the invention. The analytical engine (124) may then use the subsystem statistics to generate the feedback mechanism by adjusting individual subsystem concurrencies that effect the overall performance of the subsystem and the data protection system as a whole.

In one or more embodiments of the invention, the subsystem statistics may specify performance parameters associated with each subsystem. The performance parameters may include the number of operations per protection policy performed by the subsystems, the priority associated with each policy and/or operation, the number of requests to the metadata, the resource allocation of each subsystem, the data transfer rate, quality of service settings, and the target storage device in the storages (110) and/or any other information associated with subsystem performance of data protection services without departing from the invention. The performance parameters may include other and/or additional parameters that when adjusted, change the performance of a subsystem and therefore the overall system without departing from the invention.

In one or more embodiments of the invention, each subsystem is allocated a static number of concurrent operations by the data protection manager controller (122) as discussed above. The number of concurrent operations may then by dynamically adjusted based on the priority of the data specified by the protection policies. The priority of operations may be assigned as high priority operations, medium priority operations, and low priority operations. Each subsystem may be allocated a static concurrency (i.e., number of concurrent operations) and a percentage of this static allocation may be assigned to the high priority operations, medium priority operations, and the low priority operations. The analytical engine (124) may periodically collect subsystem statistics from each subsystem and dynamically adjust both the concurrency and the priority percentage of the concurrency (priority mappings) based on the obtained subsystem statistics. The analytical engine (124) may include other and/or additional functionalities without departing from the invention.

In one or more embodiments of the invention, the analytical engine (124) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the analytical engine (124) described throughout this application.

In one or more embodiments of the invention, the analytical engine (124) is implemented as computer instructions, e.g., computer code, stored on a persistent storage that when executed by a processor of the data protection manager (120) causes the data protection manager (120) to provide the functionality of the analytical engine (124) described throughout this application.

In one or more embodiments of the invention, the data protection manager (120) includes a metadata subsystem (128). In one or more embodiments of the invention, the metadata subsystem (128) performs at least a portion of every read, write, and/or control operation of the data protection system. The metadata subsystem (128) may include metadata (e.g., the metadata repository (138)) stored in persistent storage which may be accessed by other entities (e.g., data protection manager controller (122), analytical engine (124), host (100), storages (110), or the network (140)) or other subsystems (e.g., 102, 112, 130, 142) to perform the aforementioned read, write, and/or control operations from other subsystems. Due to the large quantity (e g, millions) of operations that require access to metadata of the metadata subsystem (128), the metadata subsystem may require optimal performance to avoid negative performance impacts on other subsystems. The metadata subsystem (128) may include other and/or additional components and may include other and/or additional other and/or additional functionalities without departing from the invention.

In one or more embodiments of the invention, the data protection manager (120) includes a compute subsystem (130). In one or more embodiments of the invention, the compute subsystem (130) includes compute devices of the system (e.g., central processing units, graphics processing units, field programmable gate arrays, etc.) and any components associated with the compute devices such as operating systems, memory, etc. The compute subsystem (130) may include the functionality to perform data processing operations to carry out the aforementioned backup and replication operations. The data processing may include reading, writing, updating, modifying, moving, deleting and/or other and/or additional data processing operations without departing from the invention. The compute subsystem (130) may include other and/or additional components and may include other and/or additional functionalities without departing from the invention.

In one or more embodiments of the invention, the data protection manager (120) includes persistent storage (126). In one or more embodiments of the invention, the persistent storage (126) stores data. The persistent storage (126) may store any quantity and any type of data without departing from the invention. The persistent storage (126) may store other and/or additional data without departing from the invention. For additional information regarding the persistent storage (126), refer to FIG. 1B.

The persistent storage (126) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (126) may utilize portions of any combination of hard disk drives, solid state disk drives, tape drives, and/or any other physical storage medium of any number of computing devices.

Figure 1B:
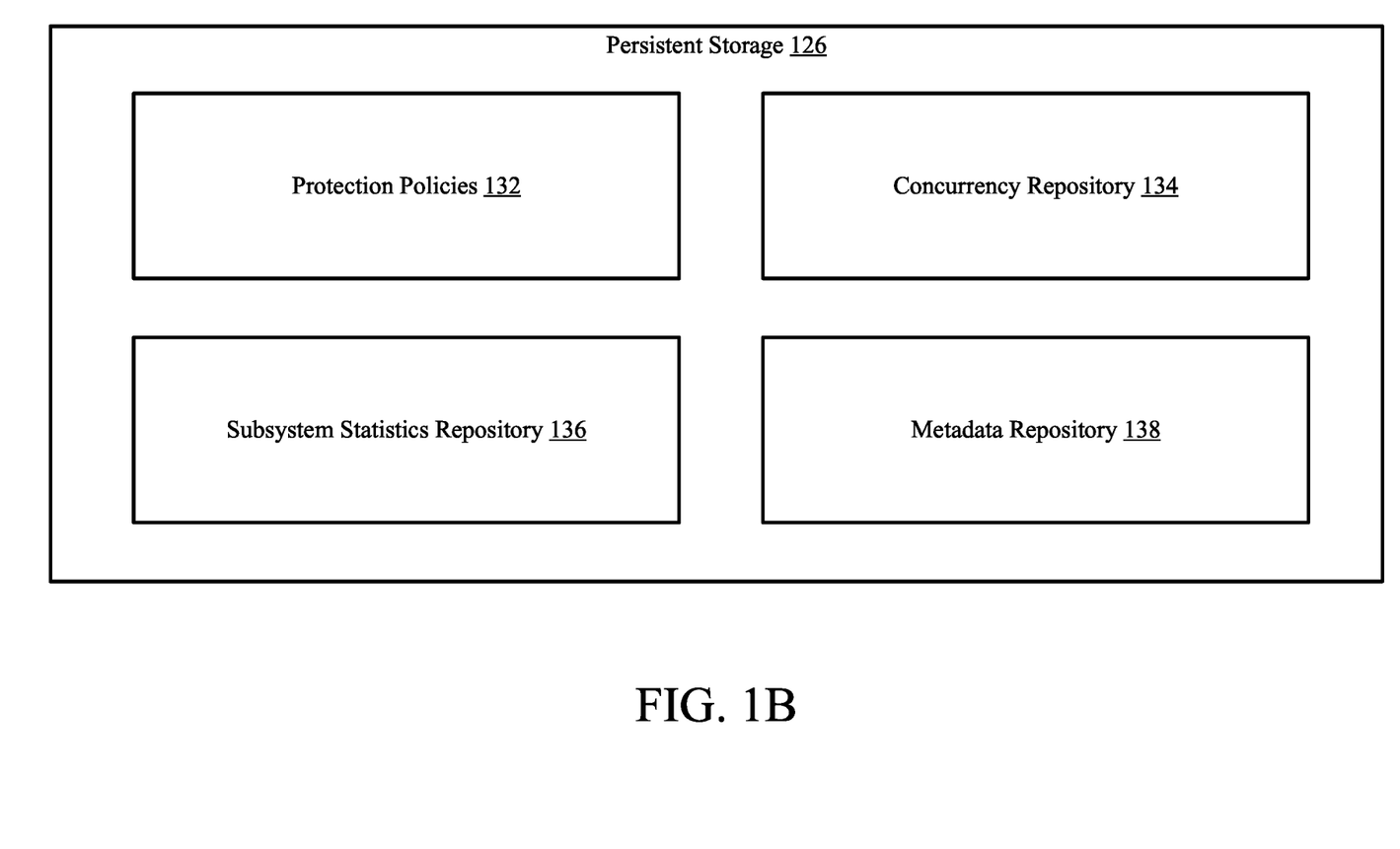
FIG. 1B shows a diagram of a persistent storage of data protection manager in accordance with one or more embodiments of the invention.

FIG. 1B shows a diagram of a persistent storage of data protection manager in accordance with one or more embodiments of the invention. As discussed above, the persistent storage (126) stores data. The persistent storage (126) may store protection policies (132), a concurrency repository (134), a subsystem statistics repository (136), and a metadata repository (138). The persistent storage (126) may store other and/or additional types of data without departing from the invention. Each of the aforementioned types of data is discussed below.

Protection policies (132) may be data structures that include various requirements for storing backups of host data. For example, the protection policies may include location, type, and a schedule for the backups to be generated. The protection policies (132) may further specify a priority as discussed above. There may be any number of protection policies (132) stored in the persistent storage (126). There may be any quantity of requirements associated with a protection policy of protection policies (132). The protection policies (132) may be analyzed by the data protection manager (120) to initiate the performance of data protection services and to determine whether the requirements of the protection policies (132) are being met.

There may be any quantity of protection policies (132) stored in the persistent storage (126). The requirements may include information regarding the to-be generated backup associated with a particular protection policy. There may be any quantity of information included in the protection policies (132) that pertain to any number of different backup guidelines included in the protection policies (132). The protection policies (132) may include other and/or additional information without departing from the invention.

The concurrency repository (134) may include one or more data structures that include concurrency information associated with each subsystem in the data protection system. The concurrency information may specify a concurrency assigned to each subsystem (i.e., the number of concurrent operations performed by the subsystem) that is associated with the protection policies (132). The concurrency information may further include priorities associated with each concurrency. The concurrency information may include historical concurrency information. In other words, the concurrency information may include previously assigned concurrencies and timestamps associated with the previously assigned concurrencies. The concurrency repository (134) may include other and/or additional information without departing from the invention.

The subsystem statistics repository (136) may include one or more data structures that include subsystem statistics information associated with each subsystem in the data protection system. The subsystem statistics information may include the performance metrics (discussed above) associated with the performance of data protection services by each subsystem. The subsystem statistics repository (136) may include other and/or additional information without departing from the invention.

The metadata repository (138) may include one or more data structure that include information associated with data stored in the data protection system. The information may include backup information that may specify storage locations, retention periods, backup identifiers, and other and/or additional types of information that may be used to perform operations of the data protection services. The metadata repository (138) may include other and/or additional information without departing from the invention.

Figure 2A:
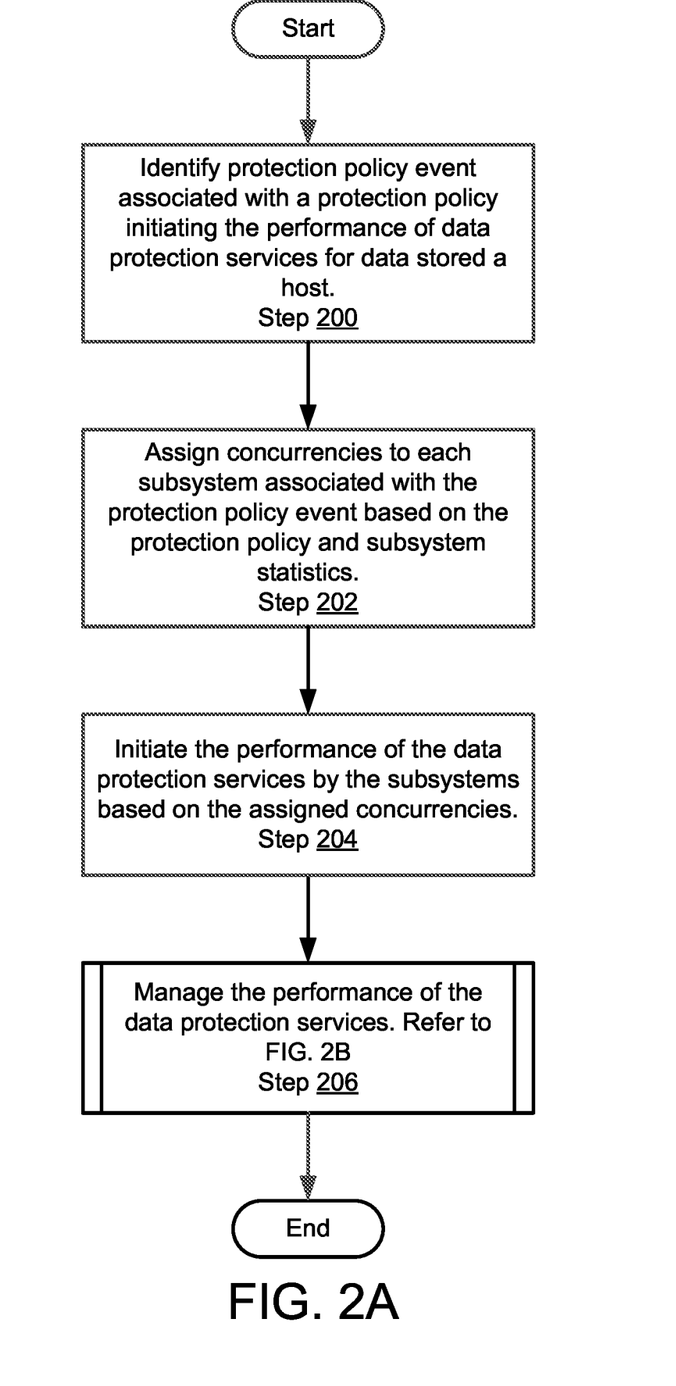
FIG. 2A shows a flowchart of a method for setting up data protection services in accordance with one or more embodiments of the invention.

FIG. 2A shows a flowchart of a method for setting up data protection services in accordance with one or more embodiments of the invention. The method may be performed by, for example, a data protection manager (120, FIG. 1A). Other components of the system illustrated in FIG. 1A may perform all, or a portion of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention.

In step 200, a protection policy event associated with a protection policy initiating the performance of data protection services for data stored in a host is identified.

In one or more embodiments of the invention, the data protection manager monitors the protection policies to identify protection policy events. As discussed above, the protection policies may specify requirements for performing data protection services for host data. The protection policies may specify backup schedules associated with the performance of data protection services. Each schedule may specify points in time to perform data protection services. The data protection manager may monitor the schedules, and therefore, may identify the occurrence of a point in time to perform data protection services specified by a schedule of a protection policy as the protection policy event. The protection policy event may include other and/or additional events that initiate the performance of data protection services (such as obtaining data protection requests from users of the system, obtaining a new protection policy from a user, etc.) without departing from the invention. A protection policy event associated with a protection policy initiating the performance of the data protection services for data stored in a host may be identified via other and/or additional methods without departing from the invention.

In step 202, concurrencies are assigned to each subsystem associated with the protection policy event based on the protection policy and subsystem statistics.

In one or more embodiments of the invention, the data protection manager uses the protection policy associated with the protection policy event and the subsystem statistics to assign the concurrencies to each subsystem. As discussed above, the protection policy may specify the data protection services associated with the protection policy event. Based on the specified data protection services, the data protection manager may identify the subsystems to perform the data protection services. The protection policy may also specify a priority associated with the data protection services. The data protection manager may use the subsystem statistics and the concurrency information of the concurrency repository associated with each identified subsystem to identify the concurrency associated with each identified subsystem. The data protection manager may also use the concurrency information of the concurrency repository to identify the priority mappings associated with each identified subsystem.

In one or more embodiments of the invention, if a subsystem is not performing data protection services associated with previous protection policy events of the same priority as the protection policy event identified in step 200 and the subsystem statistics indicate that the subsystem is not currently experiencing performance issues, then the data protection manager may assign the entire portion of the concurrency associated with the priority specified by the protection policy.

For example, the concurrency information may indicate that a host data subsystem has a concurrency of 1000 (i.e., may be capable of performing 1000 concurrent operations) and a priority mapping that specifies that fifty percent of the concurrency is associated with high priority protection policies, thirty percent of the concurrency is associated with medium priority protection policies, and twenty percent of the concurrency is associated with low priority protection policies. The protection policy event may be associated with a high priority protection policy. Therefore, the data protection manager may assign a concurrency of 500 to the host data subsystem to perform the data protection services associated with the protection policy event. In other words, the data protection manager may assign all of the portion of the concurrency of the host data subsystem associated with high priority protection policies to perform the data protection services specified by the protection policy event.

In one or more embodiments of the invention, if a subsystem is not performing data protection services associated with previous protection policy events of the same priority as the protection policy event identified in step 200 and the subsystem statistics indicate that the subsystem is currently experiencing performance issues, then the data protection manager may adjust the concurrency of the identified subsystem and assign the entire portion of the lowered concurrency associated with the priority specified by the protection policy.

For example, the concurrency information may indicate that a host data subsystem has a concurrency of 1000 (i.e., may be capable of performing 1000 concurrent operations) and a priority mapping that specifies that fifty percent of the concurrency is associated with high priority protection policies, thirty percent of the concurrency is associated with medium priority protection policies, and twenty percent of the concurrency is associated with low priority protection policies. The protection policy event may be associated with a high priority protection policy. The subsystem statistics may indicate that a component of the host data subsystem has failed. Therefore, the data protection manager may adjust the concurrency of the host data subsystem from 1000 to 500 and assign a concurrency of 250 to the host data subsystem to perform the data protection services associated with the protection policy event. In other words, the data protection manager may assign all of the portion of the adjusted concurrency of the host data subsystem associated with high priority protection policies to perform the data protection services specified by the protection policy event.

In one or more embodiments of the invention, if a subsystem is performing data protection services associated with previous protection policy events of the same priority as the protection policy event identified in step 200, then the data protection manager may equally divide the portion of the concurrency among the data protection services associated with the previous protection policy events and the data protection services associated with the protection policy event identified in step 200.

In one or more embodiments of the invention, if a subsystem is performing data protection services associated with previous protection policy events of the same priority as the protection policy event identified in step 200, then the data protection manager may assign the a concurrency as discussed above and put the data protection services associated with a protection policy event in a queue. The host data subsystem may perform the data protection services specified by the protection policy event in step 200 after the data protection services of the previous protection policy events conclude using the queue. A queue is a data structure that specifies an ordered list of elements (e.g., data protection services associated with protection policy events). There may be a queue associated with each subsystem.

Concurrencies may be assigned to each subsystem associated with the protection policy event based on the protection policy and subsystem statistics via other and/or additional methods without departing from the invention.

In step 204, the performance of data protection services by the subsystems based on the assigned concurrencies is initiated.

In one or more embodiments of the invention, the data protection manager sends messages to each of the identified subsystems associated with the protection policy event. The messages may include requests to perform the data protection services. Each message of the messages may specify what data protection services to perform. Additionally, Each message may include the assigned concurrency of the associated subsystem to perform the data protection services. The messages may include other and/or additional data and/or information without departing from the invention. In response to obtaining the messages, the subsystems may perform the data protection services using the assigned concurrencies. The performance of the data protection services by the subsystems based on the assigned concurrencies may be initiated via other and/or additional methods without departing from the invention.

In step 206, the performance of the data protection services is managed.

In one or more embodiments of the invention, the data protection manager manages the performance of the data protection services by periodically obtaining subsystem statistics associated with the performance of the data protection services. The data protection manager may adjust the concurrency of one or more subsystems based on the obtained subsystem statistics. The performance of data protection services may be managed via other and/or additional methods without departing from the invention. For additional information regarding the management of the data protection services, refer to FIG. 2B.

In one or more embodiments of the invention, the method may end following step 206.

Figure 2B:
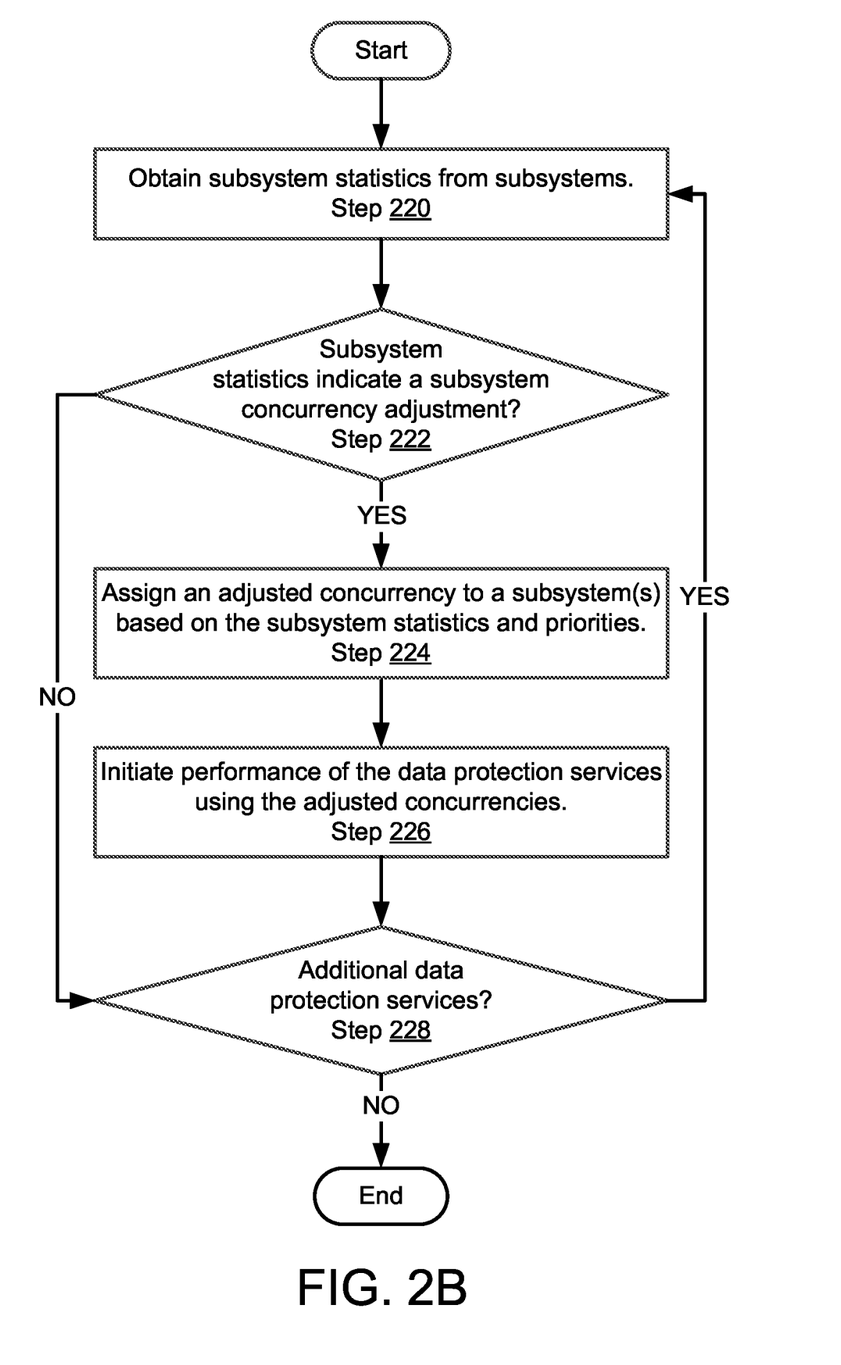
FIG. 2B shows a flowchart of a method for managing the performance of data protection services in accordance with one or more embodiments of the invention.

FIG. 2B shows a flowchart of a method for managing the performance of data protection services in accordance with one or more embodiments of the invention. The method may be performed by, for example, a data protection manager (120, FIG. 1A). Other components of the system illustrated in FIG. 1A may perform all, or a portion of the method of FIG. 2B without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In step 220, subsystem statistics are obtained from the subsystems.

In one or more embodiments of the invention, the data protection manager sends a message to the subsystems associated with the performance of the data protection services. The message may include requests for subsystem statistics. The data protection manager may periodically request subsystem statistics from the subsystems. Each subsystem may include an entity (e.g., a monitoring engine) that generates subsystem statistics associated with the performance of data protection services by the subsystem. In response to obtaining the messages, the subsystems, and/or a component of the subsystems may send the subsystem statistics to the data protection manager. The subsystem statistics may be obtained from the subsystems via other and/or additional methods without departing from the invention.

In step 222, a determination is made as to whether the subsystem statistics indicate a subsystem concurrency adjustment is required.

In one or more embodiments of the invention, the analytical engine of the data protection manager determines whether the subsystem statistics indicate a subsystem concurrency adjustment is required by comparing the obtained subsystem statistics with previously obtained subsystem statistics and the protection policy. As discussed above, the subsystem statistics includes performance characteristics associated with each subsystem. The analytical engine may compare the performance characteristics included in the obtained subsystem statistics with the performance characteristics included in previously obtained subsystem statistics.

If the performance characteristics of the obtained subsystem statistics for one of the subsystems are above an upper threshold or below a lower threshold compared to the performance characteristics of the previously obtained subsystem statistics, then the analytical engine of the data protection manager may determine that the subsystem statistics indicate a subsystem concurrency adjustment is required. If the performance characteristics of the obtained subsystem statistics for all of the subsystems are not above an upper threshold or below a lower threshold compared to the performance characteristics of the previously obtained subsystem statistics, then the analytical engine of the data protection manager may determine that the subsystem statistics do not indicate a subsystem concurrency adjustment is required. Additionally, if the performance characteristics of the obtained subsystem statistics indicate that a protection policy requirement is not being met, then the analytical engine of the data protection manager may determine that the subsystem statistics indicate a subsystem concurrency adjustment is required. If the performance characteristics of the obtained subsystem statistics indicate that all protection policy requirements are being met, then the analytical engine of the data protection manager may determine that the subsystem statistics do not indicate a subsystem concurrency adjustment is required. The determination as to whether the subsystem statistics indicate a subsystem concurrency adjustment is required may be made via other and/or additional methods without departing from the invention.

If it is determined that the subsystem statistics indicate that a subsystem concurrency adjustment is required, then the method may proceed to step 224. If it is determined that the subsystem statistics indicate that a subsystem concurrency adjustment is not required, then the method may proceed to step 228.

In step 224, adjusted concurrency is assigned to a subsystem(s) based on the subsystem statistics and the priorities.

In one or more embodiments of the invention, the analytical engine of the data protection manager uses the subsystem statistics to assign adjusted concurrencies. Additionally, the analytical engine may also adjust priority mappings associated with the adjusted concurrencies (i.e., the percentages of the adjusted concurrencies associated with high priority, medium priority, and low priority protection policies). As discussed above, the subsystem statistics may indicate whether a subsystem is performing above an upper threshold (i.e., performing better than the previously assigned concurrency) or below a lower threshold (i.e., performing worse than the previously assigned concurrency and require a concurrency adjustment.

If the subsystem statistics indicate that a subsystem is performing worse than expected or worse than a previously assigned concurrency, then the data protection manager may assign an adjusted concurrency that is lower than the previously assigned concurrency to the subsystem. The data protection manager may assign any adjusted concurrency that is lower than the previously assigned concurrency without departing from the invention. If the subsystem statistics indicate that a subsystem is performing better than expected or better than a previously assigned concurrency, then the data protection manager may assign an adjusted concurrency that is higher than the previously assigned concurrency to the subsystem. The data protection manager may assign any adjusted concurrency that is higher than the previously assigned concurrency but less than or equal to the maximum concurrency without departing from the invention. The adjusted concurrency will also be associated with the same priority and priority mappings as specified in step 202.

In one or more embodiments of the invention, the data protection manager may also assign an adjusted concurrency to one or more subsystems that are dependent upon a subsystem that was assigned an adjusted concurrency. As a result, subsystems may not face a bottleneck of operations due to the adjusted concurrency of the system or systems in which the subsystems are dependent upon.

For example, the subsystem statistics may indicate that a network subsystem is experiencing high latency. The previous concurrency associated with the network subsystem associated with the data protection services was 1000 operations with a priority mapping of 500 operations going to high priority protection policies, 300 operations going to medium priority operations, and 200 operations going to low priority operations. The protection policy associated with the data protection services may be a high priority protection policy. As a result, the network subsystem assigned a previous concurrency of 500 to perform the data protection services. Based on the latency associated with the network subsystem, the data protection manager may adjust the concurrency associated with the network subsystem and assign an adjusted concurrency of 500 operations, with 250 of those operations associated with the data protection services due to the high priority associated with the data protection services. Additionally, the data protection manager may identify that the host data subsystem and the metadata subsystem depend on the network subsystem to perform the data protection services using the subsystem statistics. Therefore, the data protection manager may also assign adjusted concurrencies to (i.e., lower the concurrencies of) the host data subsystem and the metadata subsystem in order to avoid bottlenecking, inefficiencies, and/or errors as the result of adjusting the network subsystem concurrency.

In one or more embodiments of the invention, an adjusted concurrency may be assigned to a subsystem(s) based on the subsystem statistics and the priorities via other and/or additional methods without departing from the invention.

In step 226, the performance of the data protection services using the adjusted concurrencies is initiated.

In one or more embodiments of the invention, the data protection manager sends messages to each of the identified subsystems associated with the protection policy event. The messages may include requests to perform the data protection services. Each message of the messages may specify what data protection services to perform. Additionally, Each message may include the assigned adjusted concurrency of the associated subsystem to perform the data protection services. The messages may include other and/or additional data and/or information without departing from the invention. In response to obtaining the messages, the subsystems may perform the data protection services using the assigned adjusted concurrencies. The performance of the data protection services by the subsystems may be initiated using the assigned adjusted concurrencies via other and/or additional methods without departing from the invention.

In step 228, a determination is made as to whether there are additional data protection services.

In one or more embodiments of the invention, the data protection manager determines whether there are additional data protection services using the protection policy associated with the data protection services. As discussed above, the protection policy may specify a schedule associated with the data protection services and the particular data protection services specified by the schedule. The subsystem statistics may indicate which data protection services specified by the schedule have been completed. If the schedule is not complete, i.e., there are additional data protection services not yet performed that are specified by the schedule of the protection policy, then the data protection manager may determine that there are additional data protection services. If the schedule is complete, i.e., all data protection services have performed that are specified by the schedule of the protection policy have been performed, then the data protection manager may determine that there are additional data protection services. The determination as to whether there are additional data protection services may be made via other and/or additional methods without departing from the invention.

If it is determined that there are additional data protection services, then the method may proceed to step 220. If it is determined that there are no additional data protection services, then the method may end following step 228.

EXAMPLE

Figure 3A:
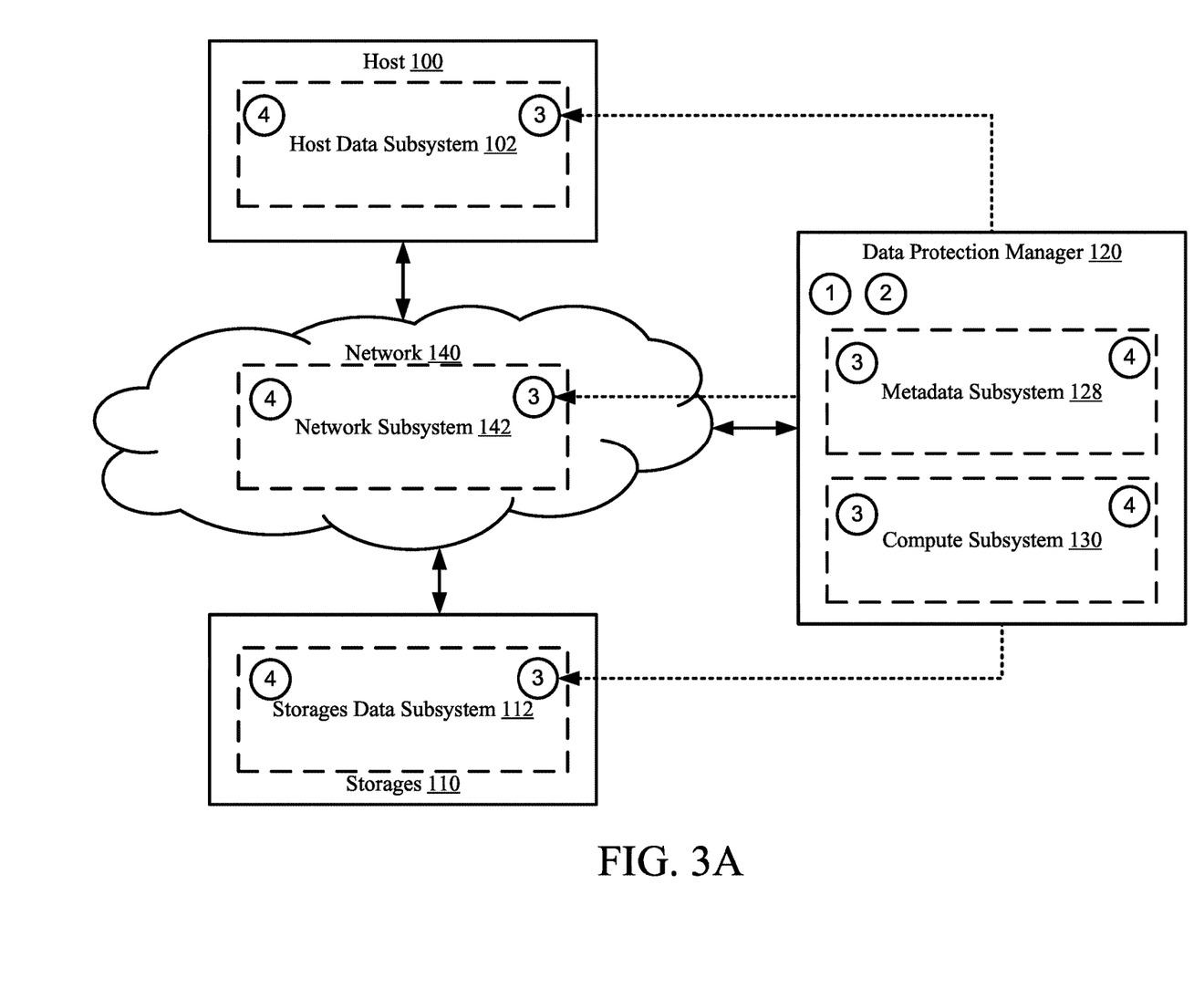
FIGS. 3A-3C show diagrams of the operation of an example system over time in accordance with one or more embodiments of the invention.
Figure 3B:
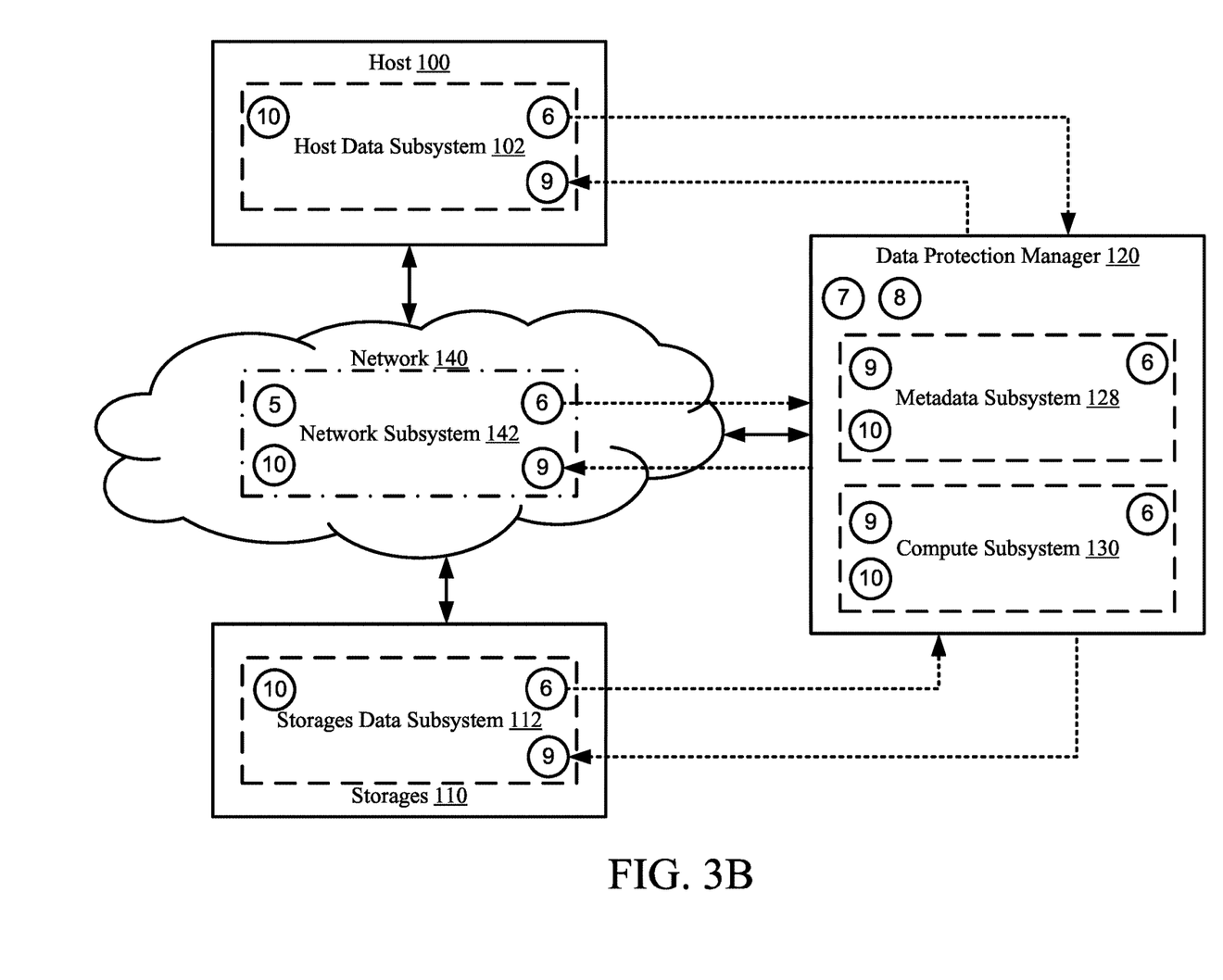
Figure 3C:
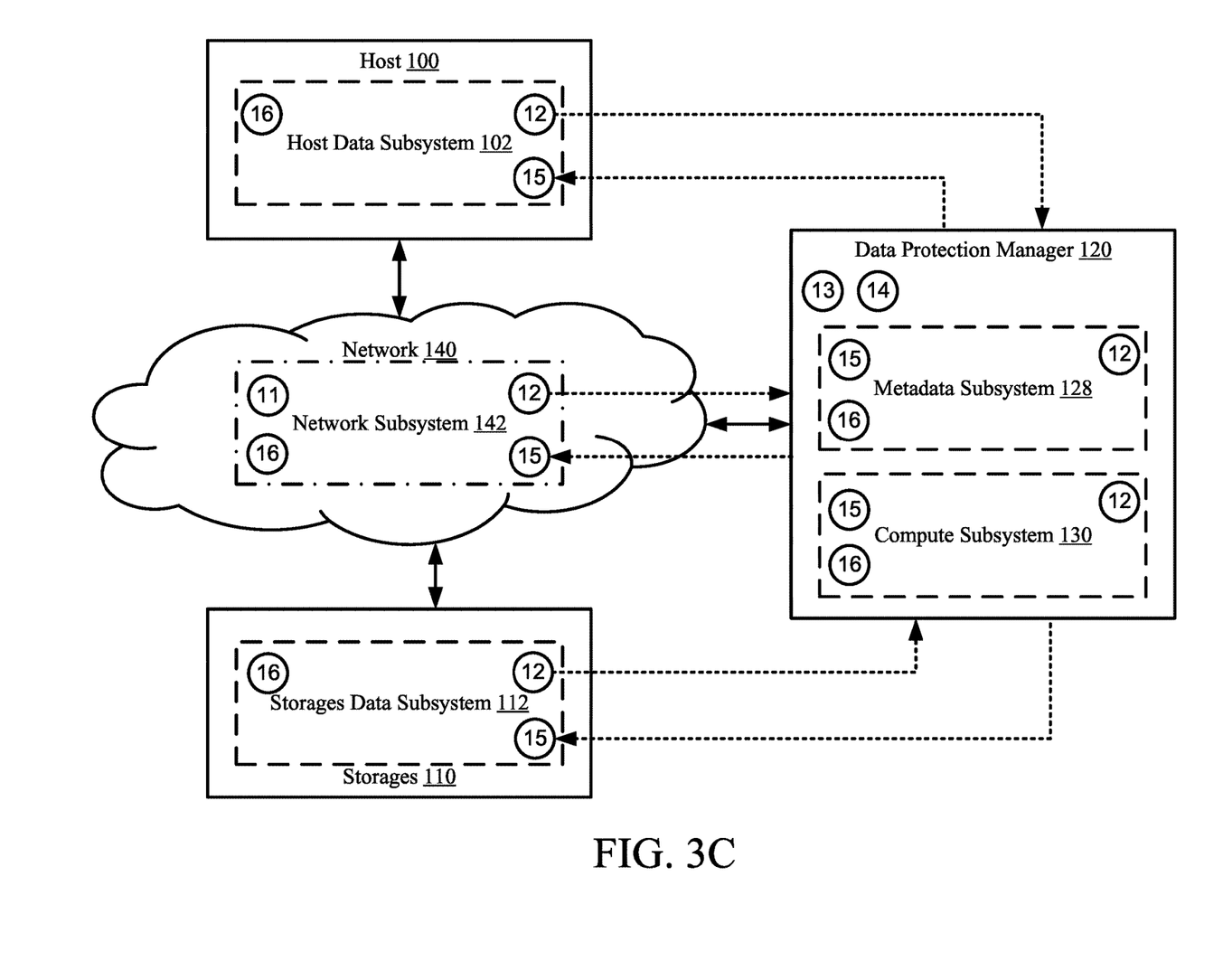

FIGS. 3A-3C show diagrams of the operation of an example system over time in accordance with one or more embodiments of the invention.

Turning to FIG. 3A, the example system includes a host (100) with a host data subsystem (102), a network (140) with a network subsystem (142), storage (110) with a storages data subsystem (112), and a data protection manager (120) with a metadata subsystem (128) and a compute subsystem (130).

At step 1, the data protection manager (120) identifies a protection policy event. In response to the identification of the protection policy event, at step 2, the data protection manager (120) assigns initial concurrencies and priorities to the subsystems (102, 142, 112, 128, 130). At step 3, the data protection manager (120) initiates the performance of data protection services specified by the protection policy event using the assigned initial concurrencies and the priority by sending a message that includes a request to perform portions of the data protection services using assigned concurrencies and priorities to the subsystems (102, 142, 112, 128, 130). After obtaining the messages, each subsystem (102, 142, 112, 128, 130), at step 4, begins performing a portion of the data protection services using the assigned initial concurrency and the priority.

Turning FIG. 3B, at step 5, a network device included in the network subsystem (142) fails. As a result, the performance of the network subsystem (142) is reduced. At some point in time after the failure of the network device, at step 6, the data protection manager (120) obtains subsystem statistics from each of the subsystems (102, 142, 112, 128, 130). At step 7, the data protection manager (120) determines that the subsystem statistics indicate that the network subsystem (142) is not operating at the assigned initial concurrency and is therefore not meeting the requirements of the protection policy associated with the protection policy event. Since the network subsystem (142) is used to transmit data between the other subsystems (102, 112, 128, 130) the operating concurrency of each of the other subsystems (102, 112, 128, 130) is below that of the initial concurrencies.

As a result, at step 8, the data protection manager (120) assigns adjusted concurrencies and priorities to all of the subsystems (102, 142, 112, 128, 130) to reduce the number of concurrencies performed by each subsystem to avoid data protection failures due to the failed network device. The adjusted concurrencies include the same assigned priorities. At step 9, the data protection manager (120) initiates the performance of the remaining data protection services specified by the protection policy event using the assigned adjusted concurrencies by sending a message that includes a request to perform portions of the remaining data protection services using assigned adjusted concurrencies to the subsystems (102, 142, 112, 128, 130). After obtaining the messages, each subsystem (102, 142, 112, 128, 130), at step 10, begins performing a portion of the data protection services using the assigned adjusted concurrency.

Turing to FIG. 3C, at step 11, the failed network device included in the network subsystem (142) is replaced. As a result, the performance of the network subsystem (142) is improved. At some point in time after the replacement of the network device, at step 12, the data protection manager (120) obtains subsystem statistics from each of the subsystems (102, 142, 112, 128, 130). At step 13, the data protection manager (120) determines that the subsystem statistics indicate that the network subsystem (142) is capable of operating at the assigned initial concurrency and is therefore capable of reverting back to the initial concurrency to meet the requirements of the protection policy associated with the protection policy event. Since the network subsystem (142) is used to transmit data between the other subsystems (102, 112, 128, 130) the concurrency of each of the other subsystems (102, 112, 128, 130) may now also be reverted back to the initial concurrencies.

As a result, at step 14, the data protection manager (120) assigns the initial concurrencies and priorities to all of the subsystems (102, 142, 112, 128, 130) to improve the operation of data protection services to meet the protection policy requirements. The initial concurrencies include the same assigned priorities. At step 15, the data protection manager (120) initiates the performance of the remaining data protection services specified by the protection policy event using the assigned initial concurrencies by sending a message that includes a request to perform portions of the remaining data protection services using assigned initial concurrencies to the subsystems (102, 142, 112, 128, 130). After obtaining the messages, each subsystem (102, 142, 112, 128, 130), at step 16, begins performing a portion of the data protection services using the assigned initial concurrency.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may improve the efficiency of providing data protection services. More specifically, embodiments of the invention relate to dynamically adjusting concurrencies of subsystems in a data protection system. An analytical engine of a data protection manager may periodically collect subsystem statistics. The analytical engine may use the subsystem statistics to determine whether subsystems require concurrency adjustments to maintain efficiency of performing data protection services for the system. Accordingly, the analytical engine may dynamically adjust the concurrencies of the subsystems based on the subsystem statistics. Additionally, the analytical manager may adjust the concurrencies of subsystems that are dependent upon a subsystem that was assigned an adjusted concurrency to maintain stability in the data protection system. As a result, the subsystems of the data protection system may be dynamically adjusted to efficiently and reliably perform the data protection services.

Thus, embodiments of the invention may address the problem of inefficient use of computing resources to perform data protection services. This problem arises due to the technological nature of the environment in which data protection services are performed.

One or more embodiments of the invention may be implemented using instructions executed by one or more processors of the data management device. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing performances of data protection services, the method comprising:
obtaining subsystem statistics from subsystems;
in response to obtaining the subsystem statistics:
making a determination that the subsystem statistics indicate a concurrency adjustment; and
in response to the determination:
assigning adjusted concurrencies to the subsystems based on the subsystem statistics, priorities, and priority mappings, wherein assigning the adjusted concurrencies comprises:
assigning a first adjusted concurrency to a first subsystem of the subsystems;
assigning an adjusted priority mapping associated with the first adjusted concurrency comprising a first adjusted percentage, a second adjusted percentage, and a third adjusted percentage of the first adjusted concurrency to high priority operations, medium priority operations, and low priority operations respectively; and
in response to assigning the first adjusted concurrency to the first subsystem, assigning a second adjusted concurrency to a second subsystem of the subsystems, wherein the second subsystem depends, at least in part, on the first subsystem to perform data protection services; and
initiating performance of the data protection services using the adjusted concurrencies.

2. The method of claim 1, wherein an adjusted concurrency of the adjusted concurrencies specifies a quantity of concurrent operations performed by a subsystem of the subsystems during the performance of the data protection services.

3. The method of claim 2, wherein the subsystem comprises one selected from a group consisting of:
a host data subsystem,
a storages data subsystem,
a network subsystem,
a metadata subsystem, and
a compute subsystem.

4. The method of claim 1, wherein the subsystem statistics of a subsystem comprises information which specifies whether the subsystem is performing a portion of the data protection services in compliance with requirements specified by a protection policy.

5. The method of claim 1, wherein the adjusted concurrencies are different than initial concurrencies, wherein the initial concurrencies were assigned to the subsystems prior to the obtaining the subsystem statistics from the subsystems.

6. The method of claim 1, wherein the adjusted concurrencies are the same as initial concurrencies, wherein the initial concurrencies were assigned to the subsystems prior to the obtaining the subsystem statistics from the subsystems.

7. A non-transitory computer readable medium comprising computer readable program code, which when executed by a computer processor enables the computer processor to perform a method for managing performances of data protection services, the method comprising:
obtaining sub system statistics from sub systems;
in response to obtaining the subsystem statistics:
making a determination that the subsystem statistics indicate a concurrency adjustment; and
in response to the determination:
assigning adjusted concurrencies to the subsystems based on the subsystem statistics, priorities, and priority mappings, wherein assigning the adjusted concurrencies comprises:
assigning a first adjusted concurrency to a first subsystem of the subsystems;
assigning an adjusted priority mapping associated with the first adjusted concurrency comprising a first adjusted percentage, a second adjusted percentage, and a third adjusted percentage of the first adjusted concurrency to high priority operations, medium priority operations, and low priority operations respectively; and
in response to assigning the first adjusted concurrency to the first subsystem, assigning a second adjusted concurrency to a second subsystem of the subsystems, wherein the second subsystem depends, at least in part, on the first subsystem to perform data protection services; and
initiating performance of the data protection services using the adjusted concurrency.

8. The non-transitory computer readable medium of claim 7, wherein an adjusted concurrency of the adjusted concurrencies specifies a quantity of concurrent operations performed by a subsystem of the subsystems during the performance of the data protection services.

9. The non-transitory computer readable medium of claim 8, wherein the subsystem comprises one selected from a group consisting of:
a host data subsystem,
a storages data subsystem,
a network subsystem,
a metadata subsystem, and
a compute subsystem.

10. The non-transitory computer readable medium of claim 7, wherein the subsystem statistics of a subsystem comprises information which specifies whether the subsystem is performing a portion of the data protection services in compliance with requirements specified by a protection policy.

11. The non-transitory computer readable medium of claim 7, wherein the adjusted concurrencies are different than initial concurrencies, wherein the initial concurrencies were assigned to the subsystems prior to the obtaining the subsystem statistics from the subsystems.

12. The non-transitory computer readable medium of claim 7, wherein the adjusted concurrencies are the same as initial concurrencies, wherein the initial concurrencies were assigned to the subsystems prior to the obtaining the subsystem statistics from the subsystems.

13. The non-transitory computer readable medium of claim 7, wherein the assigning of the adjusted concurrency to a subsystem of the subsystems based on the subsystem statistics and the priorities comprises:
assigning a first adjusted concurrency to a first subsystem of the subsystems; and
assigning a second adjusted concurrency to a second subsystem of the subsystems, wherein the second subsystem depends, at least in part, on the first subsystem to perform the data protection services.

14. A system for managing performances of data protection services, the system comprising:
persistent storage for storing subsystem statistics;
a data protection manager, comprising a processor and memory, and configured to:
obtain the subsystem statistics from subsystems;

in response to obtaining the subsystem statistics:
  make a determination that the subsystem statistics indicate a concurrency adjustment; and
  in response to the determination:
    assign adjusted concurrencies to the subsystems based on the subsystem statistics, priorities, and priority mappings, wherein assigning the adjusted concurrencies comprises:
      assigning a first adjusted concurrency to a first subsystem of the subsystems;
      assigning an adjusted priority mapping associated with the first adjusted concurrency comprising a first adjusted percentage, a second adjusted percentage, and a third adjusted percentage of the first adjusted concurrency to high priority operations, medium priority operations, and low priority operations respectively; and
      in response to assigning the first adjusted concurrency to the first subsystem, assigning a second adjusted concurrency to a second subsystem of the subsystems, wherein the second subsystem depends, at least in part, on the first subsystem to perform data protection services; and
    initiate performance of the data protection services using the adjusted concurrency.

15. The system of claim 14, wherein an adjusted concurrency of the adjusted concurrencies specifies a quantity of concurrent operations performed by a subsystem of the subsystems during the performance of the data protection services.

16. The system of claim 15, wherein the subsystem comprises one selected from a group consisting of:
  a host data subsystem,
  a storages data subsystem,
  a network subsystem,
  a metadata subsystem, and
  a compute subsystem.

17. The system of claim 14, wherein the subsystem statistics of a subsystem comprises information which specifies whether the subsystem is performing a portion of the data protection services in compliance with requirements specified by a protection policy.

\* \* \* \* \*